United States Patent [19]

Rhodes

[11] 3,974,631

[45] Aug. 17, 1976

[54] GRASS CATCHER ASSEMBLY

[75] Inventor: Keith H. Rhodes, Lincoln, Nebr.

[73] Assignee: J. I. Case Company, Racine, Wis.

[22] Filed: Jan. 24, 1975

[21] Appl. No.: 543,670

[52] U.S. Cl. .............................................. 56/202
[51] Int. Cl.² ...................................... A01D 35/22
[58] Field of Search ................ 56/202, 320.2, 13.3, 56/13.4

[56] References Cited
UNITED STATES PATENTS

| 2,990,666 | 7/1961 | Blume | 56/202 |
| 3,199,277 | 8/1965 | Moody | 56/202 X |
| 3,624,989 | 12/1971 | Gatheridge | 56/202 |
| 3,706,189 | 12/1972 | Rutherford | 56/202 X |
| 3,716,977 | 2/1973 | Jackson | 56/202 |
| 3,802,173 | 4/1974 | Opitz | 56/202 |

Primary Examiner—J.N. Eskovitz
Attorney, Agent, or Firm—Dressler, Goldsmith, Clement, Gordon & Shore, Ltd.

[57] ABSTRACT

A grass catcher assembly for a lawn mower is disclosed herein. The assembly includes a frame adapted to be attached to the mower and a pair of containers pivoted on the frame for supporting a pair of flexible bags. A cover assembly extends across the open tops of the container with a grass clipping inlet in the cover. A deflector is attached to the cover and is positioned in the path of movement of the grass clippings to provide substantially equal distribution of the clippings to the respective containers.

9 Claims, 5 Drawing Figures

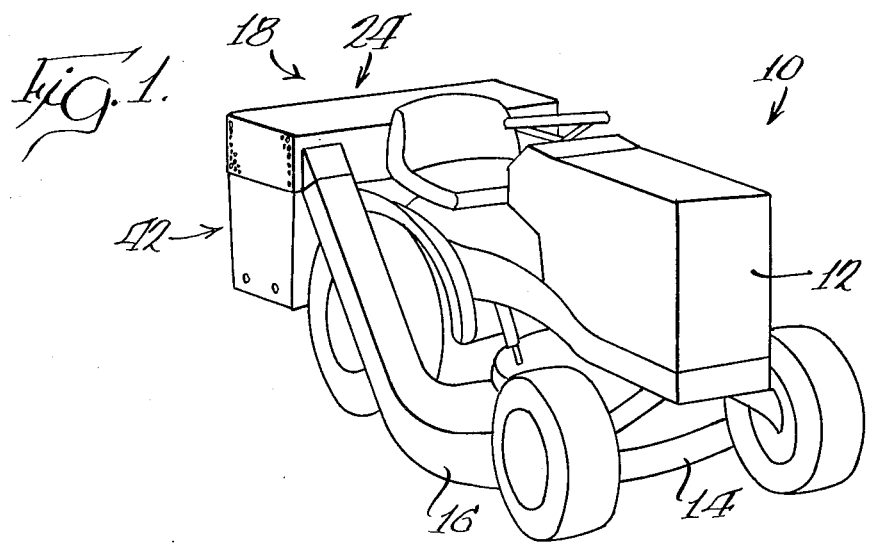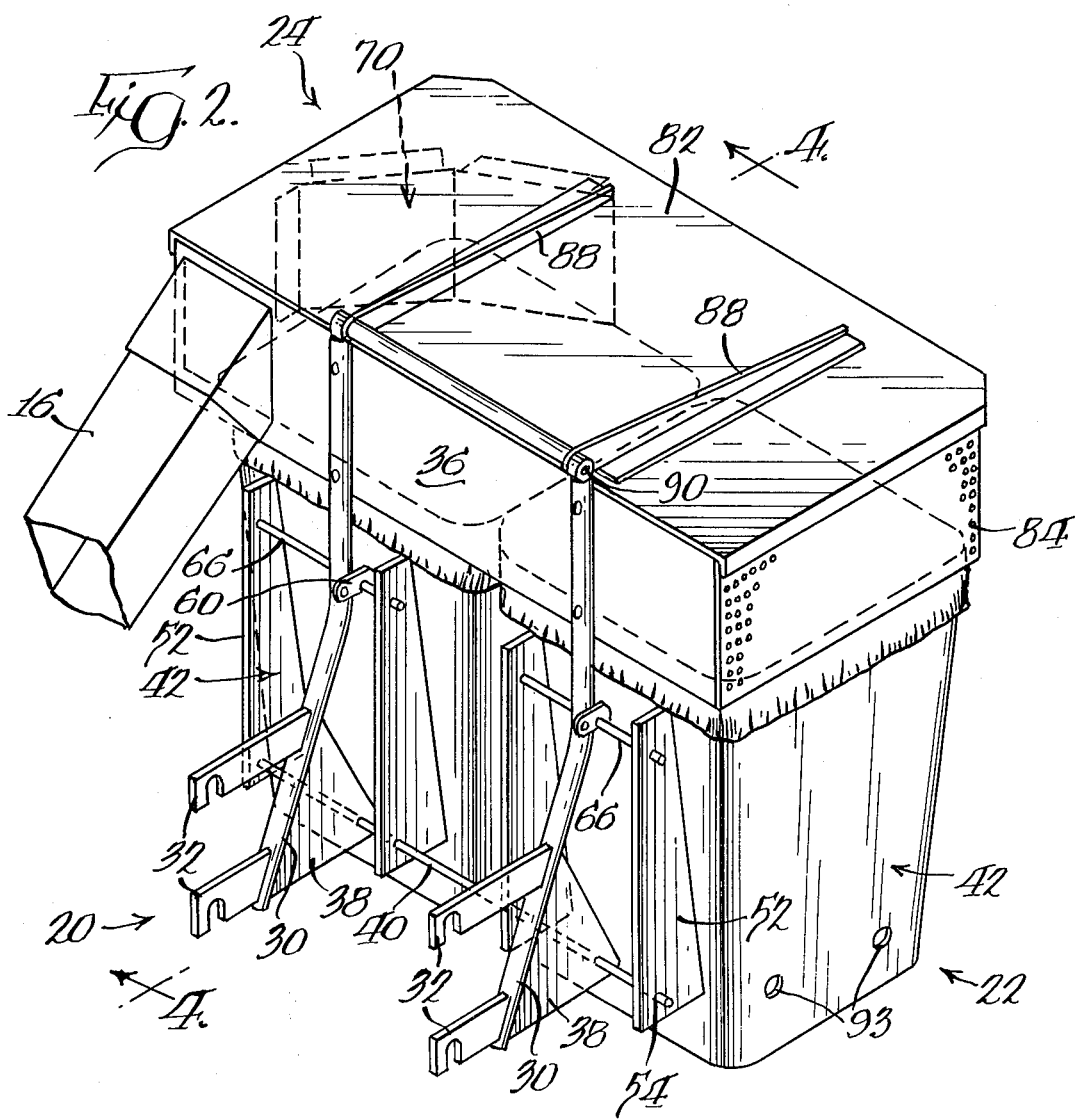

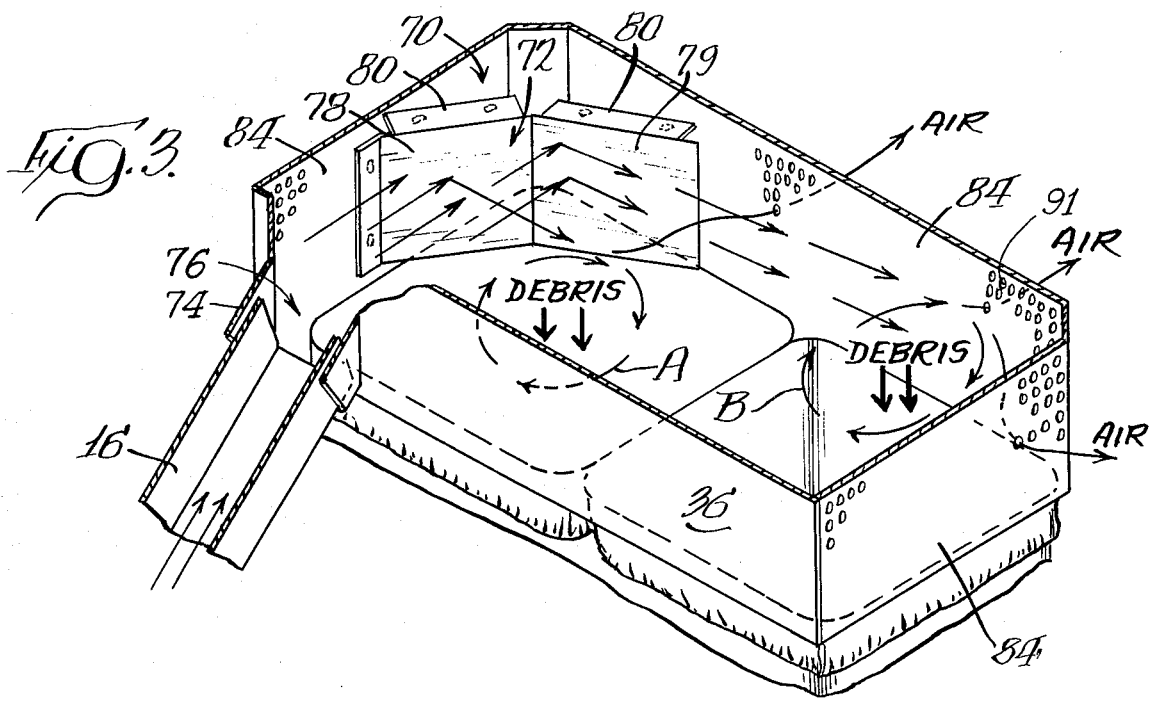
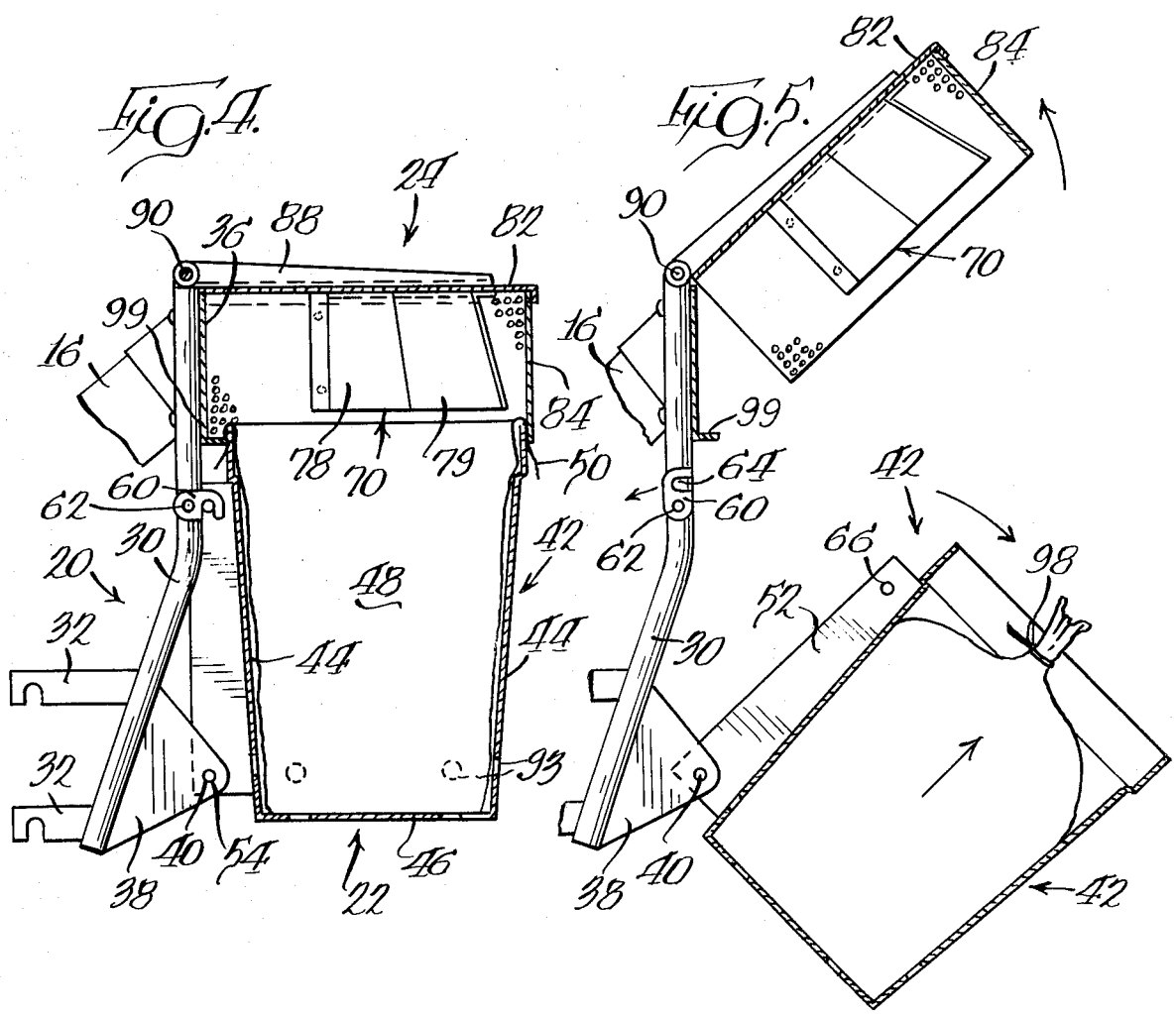

GRASS CATCHER ASSEMBLY

BACKGROUND OF THE INVENTION

The use of rotary type mowers for mowing lawns has become quite common in recent years. This type of mower has a rotor supported for rotation about a vertical axis with a plurality of cutting blades extending at radially spaced locations therefrom and the blades are supported within a circular housing having an outlet passage. The rotor and blades are driven by a motor to perform the grass cutting and the blades act as a centrifugal fan which produces a draught that blows the cut grass from the housing through the outlet passage.

The disposal of the grass clippings and other debris resulting from the mower has become a major problem in the care of today's lawns, particularly in residential areas. As is well known, the increased use of fertilizers and chemicals on lawns has resulted in thicker, more luxurious lawns. To maintain an attractive appearance for such lawns, it has become rather standard practice to mower. the grass clippings, which is usually done by a grass catching bag attached to the outlet passage of the motor. However, such bags require frequent emptying, particularly when the growth is heavy so that the homeowner is spending more time in the frequent removal of the grass catching bag and the dumping of the bag into some other receptacles. In addition, in many residential areas, the clippings must be placed in a certain type of bag in order for them to be picked up by refuse collectors which results in additional time required for the bagging of the grass clippings.

This problem becomes even more acute when utilizing larger type self-propelled vehicles which are commonly referred to as "riding mowers." With an average or larger size riding mower, the size of the rotor and blades is many times twice the size of an ordinary push type or self-propelled rotary mower.

Confronted with this problem, many proposals have been made for larger grass catching assemblies for riding mowers. Some of these include large trailing vehicles which can accumulate a large amount of grass clippings. Others are of a smaller type such as shown in U.S. Pat. No. 3,716,977, issued Feb. 20, 1973.

While grass catching assemblies of this type to some degree partially solve some of the problems, that is the collection of the grass clippings, there is still the continual problem of transferring the clippings from the catcher assembly into what has become a conventional type of disposal plastic bag for use in residential areas and one that is of suitable size as to be picked up by refuse collectors.

SUMMARY OF THE INVENTION

According to the present invention, a grass catcher assembly that is adapted to be attached to a vehicle is designed so that the grass clippings are automatically placed into disposable bags which meet the requirements for the refuse collection operation. In its preferred form, the grass catcher assembly is designed to simultaneously fill a plurality of such disposable bags that are supported in adjacent containers.

More specifically, the grass catcher assembly of the present invention consists of a frame that is adapted to be attached to a mower with container means on the frame defining a plurality of open-topped containers that respectively receive disposable bags. A single cover is supported on the frame and encloses the open tops of the containers with an inlet opening in the cover for receiving the grass clippings. The cover has deflector means located in the path of movement of the grass clippings to produce substantially equal distribution of the clippings to the open tops of all of the containers.

According to one aspect of the invention, the respective containers, being two in number in the illustrated embodiment, are pivotally supported on the frame between a generally upright position and a tilted position so that ready access can be gained to the filled disposable bags for removal and replacement.

Also, the cover is designed so that the chute leading from the mower housing to the bagger attachment can be of a fixed length.

BRIEF DESCRIPTION OF SEVERAL VIEWS OF DRAWINGS

FIG. 1 shows a perspective view of a mower having the grass catcher assembly of the present invention attached thereto;

FIG. 2 is a perspective view of the grass catcher assembly;

FIG. 3 is a fragmentary view similar to FIG. 2 with portions thereof broken away to show the movement of the grass clippings;

FIG. 4 is a sectional view, as viewed along line 4—4 of FIG. 2; and

FIG. 5 is a view similar to FIG. 4 showing the assembly in a position for removal of a filled disposable bag.

DETAILED DESCRIPTION

While this invention is susceptible of embodiment in many different forms, there is shown in the drawings and will herein be described in detail, preferred embodiments of the invention with the understanding that the present disclosure is to be considered as an exemplification of the principles of the invention and is not intended to limit the invention to the embodiments illustrated.

FIG. 1 of the drawings generally shows a mower 10, which is illustrated as what is commonly referred to as a "riding mower", consisting of a vehicle 12 that has a mower housing 14 supported thereon. Mower housing 14 supports a shaft having a plurality of cutting fan blades (not shown) located therein the the manner described above, so that grass is severed and delivered to an outlet chute 16 by centrifugal force and centrifugated air flow which carries grass clippings through the chute 16 to grass catcher assembly 18 that forms the subject matter of the present invention.

Grass catcher assembly 18, constructed in accordance with the present invention, consists of a frame assembly 20 (FIG. 4), a container assembly or means 22 and a cover assembly or means 24 with container assembly 22 and cover assembly 24 carried by frame 20.

Referring to FIG. 2, frame assembly 20 consists of a pair of transversely spaced rigid bars or angle irons 30, each having arms 32 which are adapted to be connected to vehicle 12 so that the entire grass catcher assembly 18 is suspended on the rear end of the vehicle 12. Since the manner of connection to the vehicle forms no part of the present invention, the details thereof have been eliminated. The upper ends of bars 30 are interconnected by a rigid plate 36 that will be described in detail later while the lower ends of the bars have gusset plates 38 secured thereto with a rod 40 extending between gusset plates 38. Rod 40 defines a generally horizontal pivot axis for container means 22, as will be described in more detail later.

Container means 22 consists of first and second containers 42 which are identical in construction and are both supported on rod 40 that defines a generally horizontal pivot axis. Each container 42 has side walls 44 and a bottom wall 46 with side walls 44 preferably being arranged to define a container that is rectangular in cross-section and more specifically is square. The container 42 is open at the top and is adapted to receive a disposable plastic bag 48 with the upper edge thereof draped over the upper ends of the side walls that define the open top for the container.

Each of the containers has a pair of braces 52 extending from one side wall thereof and the braces may be secured to the side wall by welding. The lower ends of braces 52 have openings 54 which receive rod 40 so that the containers may be pivoted adjacent lower bottom wall 46 about a generally horizontal pivot axis from the upright grass clipping receiving position shown in FIG. 4 to the tilted bag removing position shown in FIG. 5.

Grass catcher assembly 18 also has releasable latch means between frame 20 and container means 22 for normally maintaining the container means in a generally upright or first position shown in FIGS. 2 and 4. This latch means has been illustrated as a pair of latches 60 respectively pivoted by pins 62 on the respective bars 30. Latches 60 each have a recess (FIG. 5) for receiving a rod 66 extending between braces 52 on the respective containers.

With the arrangement so far described, the two opened top containers 42, defining container means 22, are independently pivoted about rod 40 for movement from the upright position shown in FIG. 4 to the tilted position shown in FIG. 5.

According to the broadest aspect of the present invention, cover assembly 24 consists of a single cover that covers the open tops of both containers 42 and has deflecting means 70 for producing substantially equal distribution of grass clippings to the open tops of the respective containers 42. More specifically, deflecting means 70 consists of a deflecting plate 72 depending from cover assembly 24 and located in the path of movement of grass clippings through chute 16 received in extension 74 surrounding inlet opening 76 defined in vertical plate 36. Deflecting plate 72 has first and second angularly related portions 78 and 79 each of which has a flange 80 extending therefrom that is secured to cover assembly 24, as by welding.

It has been found that by proper positioning of plate portions 78 and 79, some of the grass clippings will be deflected into a generally arcuate path indicated by arrows A while the remainder of the grass clippings or debris will be deflected into an arcuate path indicated by the arrows B, with the respective arcuate or circular paths being located above the open tops of the containers. Thus, the grass clippings and other materials passing through inlet opening 76 will be equally distributed to the respective bags 48 located in containers 42. This means that the two bags will be substantially simultaneously filled and it will be appreciated that, because of the suspended nature of container means 22, the vehicle moving across the terrain will produce a certain amount of shaking which will result in compaction of the clipping and other debris in the plastic bags so that the bags are filled with little or no air voids.

According to another aspect of the present invention, cover assembly is designed so that chute 16 leading from mower 14 can be of fixed length while the cover is pivoted with respect to containers 42.

More specifically, cover assembly 24 consists of a generally flat rectangular upper plate on top wall 82 which has three plates 84 depending from three of the peripheral edges of plate 82. The top plate 82 and the three plates 84 which define three side walls are supported on or carried by the frame 20. For this purpose, top plate or wall 82 has a pair of brackets 88 secured thereto and the brackets in turn are pivotally supported on a pin 90 that extends between bars 30 directly above the upper edge of vertical plate 36.

An inspection of FIGS. 2 and 3 shows that the rigid flat vertical plate 36 on frame 20 cooperates with top wall 82 and side walls 84 to define a cover that produces a substantially rectangular enclosure surrounding the open tops of containers 42 and places inlet opening 76 in communication with both containers 42.

The arrangement described above with respect to cover assembly 24 has the advantage in that inlet opening 76 is fixed with respect to frame 20 at all times so that the chute 16 connected thereto need not be flexible to accommodate movement of the remainder of the cover. However, in the closed position, illustrated in FIG. 4, plates 36, 82 and 84 provide a substantially completely closed enclosure around open tops of the containers.

Preferably, side walls 84 defining a major portion of cover assembly 24 having openings 91 while containers 42 have suitable openings 93 for a purpose that will now be described. The grass clippings and other debris are carried through chute 16 by the centrifugated air and the openings in plates 84, which preferably produce approximately 50% open space, are small enough to keep the debris from passing therethrough while allowing for the air to leak off or pass through the plates 84 which define a perforated or porous skirt depending from top cover of wall 82. Openings 93, preferably located adjacent the bottoms of the containers, allow air which may be trapped between container walls 44 and plastic bags 48 to be forced there-from during the filling and compacting of the grass clippings and other debris into bags 48.

It is believed that the operation of the present invention is readily understood from the above description but will now be briefly summarized. The movable portion of the container cover is pivoted from its closed position shown in FIG. 4 to an open position and disposable plastic bags 48 are located in the containers with the upper peripheral edges 50 lapped over the upper perimeter of side walls 44. The containers are then moved to the latched position shown in FIG. 4 where a portion of the bag is clamped between flange 99 and side walls 44 and the cover, particularly the movable portion including top plate 82 and side plates 84 are moved to the closed position shown in FIG. 4.

The operator then starts the mowing operation and grass clippings pass through chute 16, engage deflector means 70 and are equally distributed into the two containers while the transport medium for the debris, being air in this instance, passes through the openings in porous plates 84. The movement of the vehicle 12 across the terrain will produce a shaking action which will tend to compact grass clippings in the bags 48 and will simultaneously cause the disposable plastic bags to conform generally to the configuration of the rigid metal containers 42.

During this movement, there may be some relative movement between the grass catcher assembly 18 and chute 16 but this movement is accommodated by the axial positioning of the chute 16 within extension 74 surrounding inlet opening 76. Once the two bags are both filled, the operator pivots the movable portion of cover assembly from the closed to an open position, unlatches the respective containers by pivoting latches 60 from the position shown in FIG. 4 to that shown in FIG. 5 so that the containers can be moved from the upright position of FIG. 4 to the tilted position of FIG. 5 where the upper open tops of the container are readily accessible by the operator for closing the bags using the conventional tie wires 98 that are normally furnished with the disposable plastic bags.

A new pair of plastic bags are then inserted into containers 42 and the upper free ends 50 draped over side walls 44 of containers 42. The containers 42 are then pivoted to the upright position and latched to frame 20 by latches 60 in which position, horizontal flange 99 extending from vertical plate 36 engages the overlapped portion 50 of bags 48 to clamp these portions between containers 42 and flange 99. The cover assembly is then moved to the position shown in FIG. 4 wherein side walls 84 clamp portions 50 between two of the remaining sides of containers 42.

While a specific embodiment of the invention has been shown and described, it will be readily be apparent that numerous changes come to mind without departing from the spirit of the invention. For example, while the skirt portion of the cover assembly 24 has been shown as being formed by one vertical wall rigidly secured to frame 20 and the remaining walls secured to top wall 82, it is readily apparent that the entire cover assembly including vertical plate 36 could be pivoted on frame 20. This would require a flexible chute 16 connected to inlet opening 76. Also, if desired, the entire cover assembly could be fixed with respect to frame 20. For example, the lower edges of side walls 84 could readily be vertically aligned with side walls 44 of containers 42 so that the containers would be pivoted into engagement with lower edges of cover plate or skirt 84 during movement from the position shown in FIG. 5 to that shown in FIG. 4. This would eliminate the need for a second pivot axis for cover assembly 24. This arrangement could readily be incorporated into the illustrated embodiment of the invention since the pivot axis for container means 22 is off-set from the cover assembly so that the upper edges of side walls 44 move downwardly away from cover assembly 24 during the pivotal movement from the position shown in FIG. 4 to that shown in FIG. 5.

It is also possible that the deflector plate portions 78 and 79 and inlet opening 76 could be relocated to be positioned substantially between the two containers and arranged to define a V-shaped structure in cross-section with the base of the V directly overlying the two adjacent sides of the respective containers 42. In this situation, inlet opening 76 would also be aligned with the adjacent side walls of containers so that the debris would be divided by the V-shaped deflective plate and be distributed to the two plastic bags in the respective containers.

What is claimed is:

1. A grass catcher assembly comprising, a frame adapted to be attached to a mower; first and second open top containers respectively pivoted about a generally horizontal pivot on said frame; separate releasable latch means between said frame and respective containers for normally maintaining said containers in a generally upright position; a single cover on said frame covering the open tops of all containers, said cover having an inlet opening for receiving grass clippings from the associated mower, said containers being substantially rectangular in cross-section and said cover includes (1) a first portion fixed to said frame, said first portion having said inlet opening and extending along one side of both of said containers, and (2) a second portion pivoted on said frame adjacent first portion, said second portion having a top wall and three side walls, said second portion having a closed position and cooperating with said first portion to define a rectangular enclosure surrounding the containers; and deflector means on said cover in the path of movement of grass clippings through said inlet opening for producing substantially equal distribution of grass clippings to the open tops of said containers.

2. A grass catcher assembly as defined in claim 1, in which said inlet opening is located adjacent one end of said first portion and said deflector means includes a deflector plate secured to said top wall and depending therefrom, said plate having first and second angularly related flat portions located in the path of movement of grass clippings through said inlet means.

3. A grass catcher assembly as defined in claim 1, in which said deflector means includes a deflector plate secured to said cover and aligned with the path of movement of grass clippings through said inlet opening.

4. A grass catcher assembly comprising, a frame adapted to be attached to a mower; container means on said frame defining a plurality of open top containers; a single cover on said frame covering the open tops of all containers, said cover having an inlet opening for receiving grass clippings from the associated mower, deflector means on said cover in the path of movement of grass clippings through said inlet opening for producing substantially equal distribution of grass clippings to the open tops of all containers, said container means including first and second separate rectangular containers located in side by side relation on said frame, pivot means pivotally supporting said first and second separate containers about a generally horizontal pivot on said frame, separate latch means cooperating with the respective containers for holding said containers in a first position on said frame, said cover including a rectangular top wall carried by said frame, a rigid plate on said frame having said inlet opening therein and defining one side wall for said cover, said cover having three additional plates secured thereto to define a rectangular enclosure having an open bottom in communication with said open tops.

5. A grass catcher assembly as defined in claim 4, in which said top wall and three additional walls are pivoted about a generally horizontal pivot defined on said frame adjacent an upper edge of said rigid plate.

6. A grass catcher assembly comprising a frame adapted to be attached to a mower, a rectangular open top container having a closed bottom; pivot means on said frame for supporting said container for pivotal movement about a generally horizontal axis adjacent said closed bottom; releasable latch means on said frame for holding said container in a first position; and a cover on said frame surrounding the open top of said container when said container is in said first position, said cover including a vertical plate secured to said frame ajdacent one side of said container with said plate having an inlet opening therein for receiving grass clippings, a rectangular top plate pivoted on said frame along one edge adjacent said vertical plate and additional plates depending from the remaining edges of said top plate, said plates cooperating to define a depending skirt surrounding the open top of said container.

7. A grass catcher assembly as defined in claim 6, further including a second open top container supported on said horizontal pivot axis adjacent said first container with said cover surrounding the open tops of both said containers.

8. A grass catcher assembly comprising, a frame adapted to be attached to a mower; container means on said frame defining a plurality of open top containers; a single cover on said frame covering the open tops of all containers, said cover having an inlet opening for receiving grass clippings from the associated mower, said cover including a generally flat plate secured to said frame and extending along one side of said container means, said cover further including a portion pivoted about a horizontal pivot on said frame above said container means, said portion having a rectangular top wall and three porous side walls depending from three edges of said top wall, said flat plate cooperating with said portion to define a rectangular enclosure having an open bottom in communication with the open tops of said containers, and deflector means on said cover in the path of movement of grass clippings through said inlet opening for producing substantially equal distribution of grass clippings to the open tops of all containers.

9. A grass catcher assembly comprising a frame adapted to be attached to a mower, first and second open top containers adapted to support flexible receptacles, each container having a closed bottom; pivot means on said frame for supporting said containers about a generally horizontal axis adjacent said closed bottom; releasable latch means on said frame for holding said containers in a first position; and a cover on said frame surrounding the open top of said containers when said containers are in said first position, said cover including a vertical plate on said frame adjacent one side of both of said containers with said plate having an inlet opening therein, a rectangular top wall pivoted on said frame along one edge adjacent said vertical plate and plates secured to said top wall along the remaining edges, said plates cooperating to define a depending skirt surrounding the open tops of said containers; and deflecting means depending from said top wall in the path of movement of grass clippings through said inlet opening for producing substantially equal distribution of grass clippings to said containers.

* * * * *